(12) United States Patent
Regan et al.

(10) Patent No.: US 8,960,745 B2
(45) Date of Patent: Feb. 24, 2015

(54) ZONED ACTIVATION MANUFACTURING VACUUM TOOL

(75) Inventors: Patrick Conall Regan, Taichung (TW);
Kuo-Hung Lee, Yunlin County (TW);
Chih-Chi Chang, Yunlin County (TW);
Chang-Chu Liao, Yunlin County (TW);
Ming-Feng Jean, Yunlin County (TW)

(73) Assignee: NIKE, Inc, Beaverton, OR (US)

( * ) Notice: Subject to any disclaimer, the term of this patent is extended or adjusted under 35 U.S.C. 154(b) by 0 days.

(21) Appl. No.: 13/421,521

(22) Filed: Mar. 15, 2012

(65) Prior Publication Data

US 2013/0129464 A1    May 23, 2013

Related U.S. Application Data

(63) Continuation-in-part of application No. 13/299,934, filed on Nov. 18, 2011.

(51) Int. Cl.
*B66C 1/02* (2006.01)
*B25J 15/06* (2006.01)

(52) U.S. Cl.
CPC .......... *B25J 15/0625* (2013.01); *B25J 15/0691* (2013.01)
USPC ............................................ 294/65; 294/185

(58) Field of Classification Search
USPC .................. 294/185, 65, 186, 188, 183, 64.2; 901/40; 414/627, 737
See application file for complete search history.

(56) References Cited

U.S. PATENT DOCUMENTS

| | | | |
|---|---|---|---|
| 3,220,723 A | 11/1965 | Rabinow | |
| 3,357,091 A | 12/1967 | Reissmueller et al. | |
| 3,464,102 A | 9/1969 | Soloff | |
| 3,848,752 A | 11/1974 | Branch et al. | |
| 4,389,064 A | 6/1983 | Laverriere | |
| 4,775,290 A | 10/1988 | Brown et al. | |
| 4,865,680 A | 9/1989 | Pierson | |
| 4,865,687 A | 9/1989 | Pierson | |
| 5,050,919 A | 9/1991 | Yakou | |

(Continued)

FOREIGN PATENT DOCUMENTS

| | | |
|---|---|---|
| EP | 0123173 | 3/1988 |
| EP | 0790010 | 4/2001 |

(Continued)

OTHER PUBLICATIONS

Notification of Transmittal of the International Search Report and the Written Opinion of the International Searching Authority, or the Declaration in PCT/US12/65544 mailed Jan. 28, 2013, 14 pages.
Notification of Transmittal of the International Search Report and the Written Opinion of the International Searching Authroity, or the Declaration in PCT/US12/65521 mailed Feb. 5, 2013, 13 pages.
Notification of Transmittal of the International Search Report and the Written Opinion of the International Searching Authority, or the Declaration in PCT/US12/65547 mailed Feb. 5, 2013, 11 pages.

(Continued)

*Primary Examiner* — Saul Rodriguez
*Assistant Examiner* — Gabriela Puig
(74) *Attorney, Agent, or Firm* — Shook, Hardy & Bacon L.L.P

(57) ABSTRACT

Aspects relate to systems, methods, and apparatus for a zoned vacuum tool comprised of independently operable vacuum sources provided a vacuum force to segregated zones. A vacuum force is generated in connection with a first zone independently of an activation or deactivation of vacuum force generation associated with a second zone. Therefore, a single vacuum tool can selectively apply a vacuum force to material portions, which allows for control as to which material portions are manipulated by the vacuum tool.

22 Claims, 12 Drawing Sheets

(56) References Cited

U.S. PATENT DOCUMENTS

| | | | |
|---|---|---|---|
| 5,414,617 | A | 5/1995 | Pomerleau et al. |
| 5,427,301 | A | 6/1995 | Pham et al. |
| 5,609,377 | A | 3/1997 | Tanaka |
| 5,772,100 | A | 6/1998 | Patrikios |
| 6,127,822 | A | 10/2000 | Sasahara et al. |
| 6,238,503 | B1 | 5/2001 | Kakehi |
| 6,533,885 | B2 | 3/2003 | Davis et al. |
| 6,599,381 | B2 | 7/2003 | Urlaub et al. |
| 6,672,576 | B1 | 1/2004 | Walker |
| 6,718,604 | B1 | 4/2004 | Taga et al. |
| 6,823,763 | B1 | 11/2004 | Foster et al. |
| 6,979,032 | B2 * | 12/2005 | Damhuis .................... 294/65 |
| 7,296,834 | B2 | 11/2007 | Clark et al. |
| 7,387,627 | B2 | 6/2008 | Erb et al. |
| 7,476,289 | B2 | 1/2009 | White |
| 7,481,472 | B2 * | 1/2009 | Cawley et al. ............... 294/2 |
| 7,717,482 | B2 | 5/2010 | Iwasaki |
| 2002/0153735 | A1 * | 10/2002 | Kress ...................... 294/87.1 |
| 2003/0062110 | A1 | 4/2003 | Urlaub et al. |
| 2003/0160084 | A1 | 8/2003 | Higashiyama |
| 2003/0189114 | A1 | 10/2003 | Taylor et al. |
| 2004/0034963 | A1 | 2/2004 | Rogers et al. |
| 2004/0212205 | A1 | 10/2004 | Linker et al. |
| 2005/0050669 | A1 | 3/2005 | Castello |
| 2006/0196332 | A1 | 9/2006 | Dowing et al. |
| 2007/0228751 | A1 | 10/2007 | Viavattine et al. |
| 2007/0290517 | A1 | 12/2007 | Nagai et al. |
| 2010/0040450 | A1 * | 2/2010 | Parnell .................. 414/752.1 |
| 2011/0123359 | A1 | 5/2011 | Schaaf |
| 2011/0232008 | A1 | 9/2011 | Crisp |
| 2011/0278870 | A1 | 11/2011 | Omiya et al. |
| 2012/0126554 | A1 | 5/2012 | Becker et al. |

FOREIGN PATENT DOCUMENTS

| | | |
|---|---|---|
| EP | 2060348 | 2/2011 |
| WO | 9955186 | 11/1999 |
| WO | 2004062842 | 7/2004 |
| WO | 2011064138 | 6/2011 |

OTHER PUBLICATIONS

Notification of Transmittal of the International Search Report and the Written Opinion of the International Searching Authority, or the Declaration in PCT/US12/65563 mailed Feb. 7, 2013, 12 pages.

Notification of Transmittal of the International Search Report and the Written Opinion of the International Searching Authority, or the Declaration in PCT/US12/65565 mailed Feb. 7, 2013, 11 pages.

Non-Final Office Action in U.S. Appl. No. 13/299,934 mailed Mar. 28, 2013, 29 pages.

Non-Final Office Action in U.S. Appl. No. 13/299,890 mailed Mar. 28, 2013, 26 pages.

Non-Final Office Action in U.S. Appl. No. 13/421,525 mailed Apr. 24, 2013, 34 pages.

Notification of Transmittal of the International Search Report and the Written Opinion of the International Searching Authority, or the Declaration in PCT/US13/30393 mailed May 15, 2013, 74 pages.

Final Office Action in U.S. Appl. No. 13/299,934 mailed Nov. 19, 2013, 37 pages.

Final Office Action in U.S. Appl. No. 13/421,525 mailed Nov. 20, 2013, 36 pages.

Non-Final Office Action in U.S. Appl. No. 13/421,514 mailed Nov. 20, 2013, 20 pages.

Notice of Allowance and Fee(s) Due in U.S. Appl. No. 13/299,890 mailed Nov. 20, 2013, 31 pages.

Notification of Transmittal of the International Search Report and the Written Opinion of the International Searching Authority, or the Declaration in PCT/US12/65542, mailed Feb. 8, 2013, 65 pages.

Non-Final Office Action in U.S. Appl. No. 13/299,908 mailed Feb. 27, 2014, 28 pages.

Notice of Allowance and Fee(s) Due mailed Jun. 9, 2014 in U.S. Appl. No. 13/299,908, 8 pages.

Non-Final Office Action mailed Jul. 18, 2014 in U.S. Appl. No. 13/421,525, 19 pages.

Final Office Action mailed Jul. 23, 2014 in U.S. Appl. No. 13/421,514, 8 pages.

Non-Final Office Action mailed Jun. 20, 2014 in U.S. Appl. No. 13/299,934, 15 pages.

* cited by examiner

US 8,960,745 B2

ZONED ACTIVATION MANUFACTURING VACUUM TOOL

CROSS-REFERENCE TO RELATED APPLICATION

This application is a Continuation-in-part application of U.S. application Ser. No. 13/299,934, filed Nov. 18, 2011, entitled "MANUFACTURING VACUUM TOOL". This application is also related by subject matter to (1) U.S. patent application Ser. No. 13/299,908, filed Nov. 18, 2011, entitled "MULTI-FUNCTIONAL MANUFACTURING TOOL;" and (2) U.S. patent application Ser. No. 13/421,525, entitled "SWITCHABLE PLATE MANUFACTURING VACUUM TOOL." The entirety of each aforementioned application is incorporated by reference herein.

BACKGROUND

Traditionally, parts used in manufacturing a product are picked up and placed in a position for manufacturing by human hand or robotic means. However, current robotic means have not provided a level of control, dexterity, and effectiveness to be cost-effectively implemented in some manufacturing systems.

SUMMARY

Aspects of the present invention relate to systems and apparatus for a vacuum tool comprised of two or more zones that are independently able to utilize a vacuum force for manipulation of material portion(s). The vacuum tool is effective for picking and placing one or more manufacturing parts utilizing the vacuum force.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems and apparatus for a vacuum tool comprised of two or more zones that are independently able to utilize a vacuum force for manipulation of material portion(s). The vacuum tool is effective for picking and placing one or more manufacturing parts utilizing the vacuum force.

Accordingly, in one aspect the vacuum tool is comprised of a first vacuum distributor associated with a first vacuum source, such that the first vacuum source aids in generating a vacuum force in connection with the first vacuum distributor. Similarly, the vacuum tool is also comprised of a second vacuum distributor portion and a second vacuum source that aids in generating a vacuum force in connection with the second vacuum distributor. The vacuum fore generated in connection with the first vacuum distributor is independent of the vacuum force generated in connection with the second vacuum distributor. It is contemplated that the first vacuum distributor and the second vacuum distributor are independently controllable for generating vacuum forces.

In another aspect, the present invention provides a method of operating a zoned vacuum tool. The method is comprised of activating a first plate portion of the vacuum tool. The activation results in a vacuum force proximate the activated plate portion. The vacuum force may provide an attractive force that is useable for manipulating one or more portions of material. The method is further comprised of activating a second plate portion. In an exemplary aspect, the first plate portion and the second plate portion are collocated on a common plate. The method is further comprised of deactivating the first plate portion, which results in a smaller vacuum force proximate the first plate portion than is experienced when the plate portion is activated. Deactivation may entirely stop the vacuum force effect or it may diminish the vacuum force.

Having briefly described an overview of embodiments of the present invention, a more detailed description follows.

Figure 1:
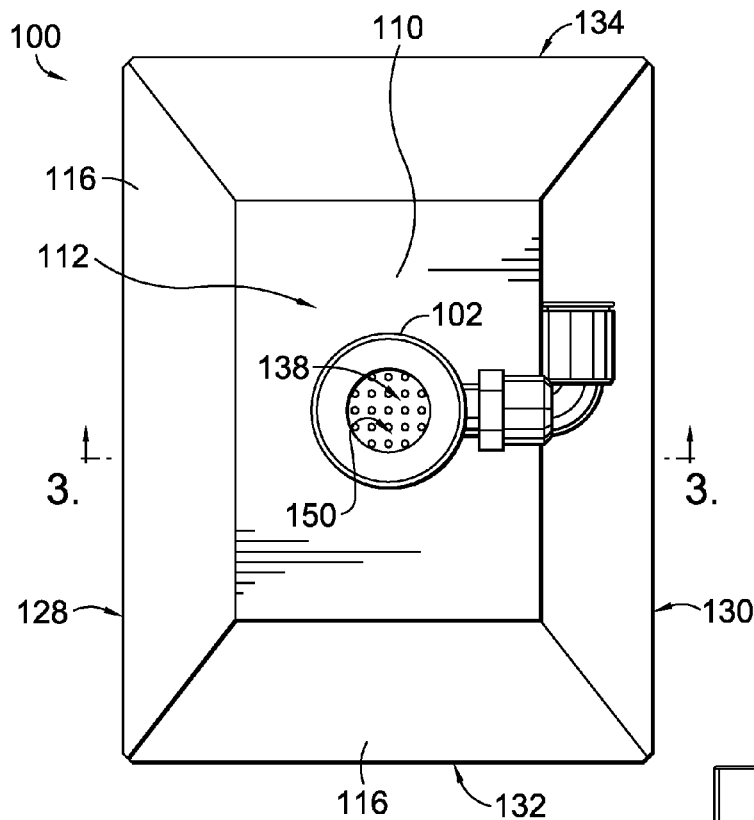
FIG. 1 depicts a top-down view of an exemplary vacuum tool, in accordance with embodiments of the present invention.

FIG. 1 depicts a top-down view of an exemplary vacuum tool 100, in accordance with embodiments of the present invention. In various aspects, the vacuum tool 100 may also be referred to as a vacuum-powered part holder. For example, the vacuum tool 100 may be useable in an automated (or partially automated) manufacturing process for the movement, positioning, and/or maintaining of one or more parts. The parts manipulated by the vacuum tool 100 may be rigid, malleable, or any combination of characteristics (e.g., porous, non-porous). In an exemplary aspect, the vacuum tool 100 is functional for picking and placing a part constructed, at least in part, of leather, polymers (e.g., PU, TPU), textiles, rubber, foam, mesh, and/or the like.

The material to be manipulated by a vacuum tool may be of any type. For example, it is contemplated that a vacuum tool described herein is adapted for manipulating (e.g., picking and placing) flat, thin, and/or lightweight parts of various shapes, materials, and other physical characteristics (e.g. pattern cut textiles, non-woven materials, mesh, plastic sheeting material, foams, rubber). Therefore, unlike industrial-scaled vacuum tools functional for manipulating a heavy, rigid, or non-porous material, the vacuum tools provided herein are able to effectively manipulate a variety of materials (e.g., light, porous, flexible).

The vacuum tool 100 is comprised of a vacuum generator 102. The vacuum generator generates a vacuum force (e.g., low pressure gradient relative to ambient conditions). For example, the vacuum generator may utilize traditional vacuum pumps operated by a motor (or engine). The vacuum generator may also utilize a venturi pump to generate a vacuum. Further yet, it is contemplated that an air amplifier, which is also referred to as a coandă effect pump, is also utilized to generate a vacuum force. Both the venturi pump and the coandă effect pump operate on varied principles of converting a pressurized gas into a vacuum force effective for maintaining a suction action. While the following disclosure will focus on the venturi pump and/or the coandă effect pump, it is contemplated that the vacuum generator may also be a mechanical vacuum that is either local or remote (coupled by way of tubing, piping, and the like) to the vacuum tool 100.

The vacuum tool 100 of FIG. 1 is also comprised of a vacuum distributor 110. The vacuum distributor 110 distributes a vacuum force generated by the vacuum generator 102 across a defined surface area. For example, a material to be manipulated by the vacuum tool 100 may be a flexible material of several square inches in surface area (e.g., a leather portion for a shoe upper). As a result of the material being at least semi-flexible, the vacuum force used to pick up the part may be advantageously dispersed across a substantial area of the part. For example, rather than focusing a suction effect on a limited surface area of a flexible part, which may result in bending or creasing of the part once support underneath of the part is removed (e.g., when the part is lifted), dispersing the suction effect across a greater area may inhibit an undesired bending or creasing of the part. Further, it is contemplated that a concentrated vacuum (non-dispersed vacuum force) may damage a part once a sufficient vacuum is applied. Therefore, in an aspect of the present invention, the vacuum force generated by the vacuum generator 102 is distributed across a larger potential surface area by way of the vacuum distributor 110.

In an exemplary aspect, the vacuum distributor 110 is formed from a semi-rigid to rigid material, such as metal (e.g., aluminum) or polymers. However, other materials are contemplated. The vacuum tool 100 is contemplated as being manipulated (e.g. moved/positioned) by a robot, such as a multi-axis programmable robot. As such, limitations of a robot may be taken into consideration for the vacuum tool 100. For example, weight of the vacuum tool 100 (and/or a manufacturing tool 10 to be discussed hereinafter) may be desired to be limited in order to limit the potential size and/or costs associated with a manipulating robot. Utilizing weight as a limiting factor, it may be advantageous to form the vacuum distributor in a particular manner to reduce weight while still achieving a desired distribution of the vacuum force.

Other consideration may be evaluated in the design and implementation of the vacuum tool 100. For example, a desired level of rigidity of the vacuum tool 100 may result in reinforcement portions and material removed portions, as will be discussed with respect to FIG. 17 hereinafter, being incorporated into the vacuum tool 100.

The vacuum distributor 110 is comprised of an exterior top surface 112 and an exterior side surface 116. FIG. 1 depicts a vacuum distributor with a substantially rectangular footprint. However, it is contemplated that any footprint may be utilized. For example, a non-circular footprint may be utilized. A non-circular footprint, in an exemplary aspect, may be advantageous as providing a larger useable surface area for manipulating a variety of part geometries. Therefore, the use of a non-circular footprint may allow for a greater percentage of the footprint to be in contact with a manipulated part as compared to a circular footprint. Also with respect to shape of a vacuum tool 100 beyond the footprint, it is contemplated, as will be discussed hereinafter, that any three-dimensional geometry may be implemented for the vacuum distributor 110. For example, an egg-like geometry, a pyramid-like geometry, a cubical-like geometry, and the like may be utilized. In an exemplary aspect, a rectangular footprint may provide an easier geometry than a non-rectangular footprint for referencing a location of a part relative to the footprint.

The exemplary vacuum distributor 110 of FIG. 1 is comprised of the exterior top surface 112 and a plurality of exterior side surfaces 116. The vacuum distributor 110 also terminates at edges resulting in a first side edge 128, a second parallel side edge 130, a front edge 132, and an opposite parallel back edge 134.

Figure 2:
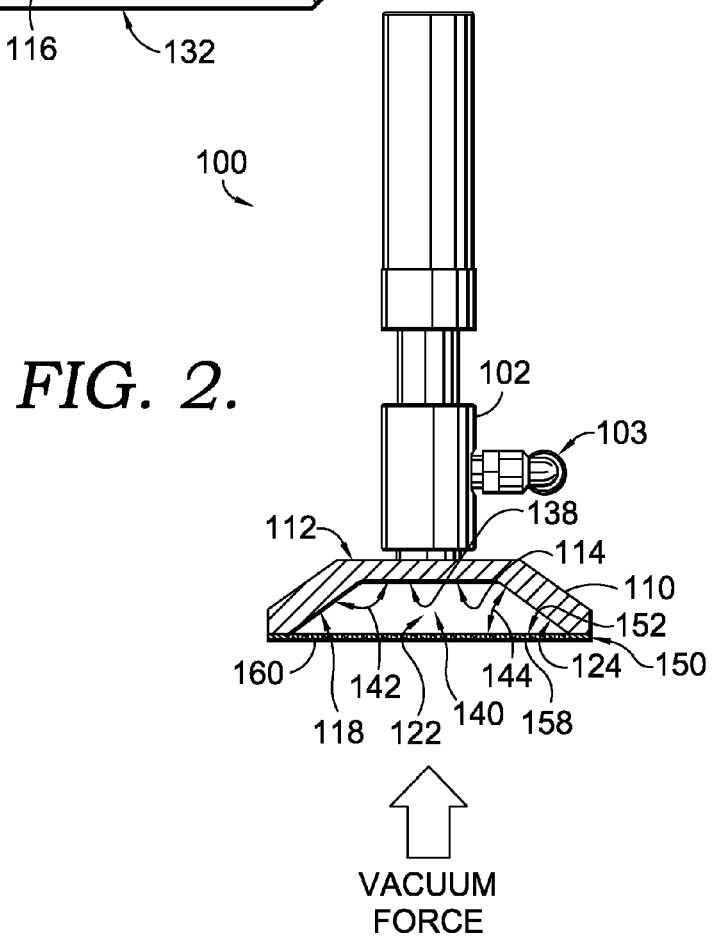
FIG. 2 depicts a front-to-back perspective cut view along a cut line that is parallel to cutline 3-3 of the vacuum tool in FIG. 1, in accordance with aspects of the present invention.

FIG. 1 depicts a cutline 3-3 demarking a parallel view perspective for FIG. 2. FIG. 2 depicts a front-to-back perspective cut view that is parallel along cut line 3-3 of the vacuum tool 100, in accordance with aspects of the present invention. FIG. 2 depicts, among other features, a vacuum distribution cavity 140 and a vacuum plate 150 (also sometimes referred to as the "plate" herein). The vacuum distributor 110 and the plate 150, in combination, define a volume of space forming the vacuum distribution cavity 140. The vacuum distribution cavity 140 is a volume of space that allows for the unobstructed flow of gas to allow for an equalized dispersion of a vacuum force. In an exemplary aspect, the flow of gas (e.g., air) from the plate 150 to the vacuum generator 102 is focused through the utilization of angled interior side surface(s) 118. As depicted in FIG. 2, there are four primary interior side surfaces 118, a first interior side surface, a second interior side surface 122, a third interior side surface 124, and a fourth interior side surface. However, it is contemplated that other geometries may be utilized.

The interior side surfaces 118 extend from the interior top surface 114 toward the plate 150. In an exemplary aspect, an obtuse angle 142 is formed between the interior top surface and the interior side surfaces 118. The obtuse angle provides an air vacuum distribution effect that reduces internal turbulence of air as it passes from the plate 150 toward a vacuum aperture 138 serving the vacuum generator 102. By angling the approach of air as it enters the vacuum aperture 138, a reduced amount of material may be utilized with the vacuum distributor 110 (e.g., resulting in a potential reduction in weight) and the flow of air may be controlled through a reduction in air turbulence. However, aspects contemplate a right angle such as that formed by a cube-like structure, a cylinder-like structure and the like.

An angle 144 may also be defined by the intersection of the interior side surfaces 118 and the plate 150. For example, if the angle 142 is obtuse, the angle 144 is acute. Again, having an acute angle 144 may provide advantages with the flow of air and the ability to reduce/limit weight of the vacuum tool 100 in general.

A surface area of the interior top surface 114 may be less than a surface area of the exterior plate surface 158 when an obtuse angle is utilized between the top surface 114 and one or more interior side surfaces 118. This potential discrepancy in surface area serves as a funneling geometry to further reduce turbulence and effectively disperse a vacuum force.

In an exemplary aspect, the interior side surfaces 118 are in a parallel relationship with an associated exterior side surface 116. Similarly, in an exemplary aspect the interior top surface 114 is in a parallel relationship, at least in part, with the exterior top surface 112. However, it is contemplated that one or more of the surfaces are not in a parallel relationship with an associated opposite surface. For example, if one or more of the interior surfaces are curved in one or more directions, the exterior surface may instead maintain a linear relationship that is, at the most, tangential to the interior surfaces. Similarly, it is contemplated that the interior and exterior surfaces may maintain a parallel (either linear or curved) relationship in part or in whole.

The vacuum aperture 138 may include a series of threads allowing the vacuum generator 102 to be screwed and secured to the vacuum distribution cavity. Similarly, it is contemplated that other mating patterns (e.g., tapering) may be formed on the interior surface of the vacuum aperture 138 and the vacuum generator 102 to secure the vacuum generator 102 and the vacuum distributor 110 together with a air-tight bond.

The plate 150, which will be discussed in greater detail in FIGS. 5-15 hereinafter, has an interior plate surface 152 (i.e., top surface) and an opposite exterior plate surface 158 (i.e., bottom surface). The plate 150 may be a sheet-like structure, panel-like structure, and/or the like. The exterior plate surface 158 is adapted for contacting a part to be manipulated by the vacuum tool 100. For example, the plate 150 in general, or the exterior plate surface 158 in particular, may be formed from a non-marring material. For example, aluminum or a polymer may be used to form the plate 150 in whole or in part. Further, it is contemplated that the plate 150 is a semi-rigid or rigid structure to resist forces exerted on it from the vacuum generated by the vacuum generator 102. Therefore, the plate 150 may be formed of a material having a sufficient thickness to resist deforming under pressures created by the vacuum generator 102. Further, it is contemplated that the plate 150 and/or the vacuum distributor 110 are formed from a non-compressible material. Further, it is contemplated that the vacuum tool 100 does not form to the contours of a part being manipulated as would a suction-cup like device. Instead, the semi-rigid to rigid material maintain a consistent form regardless of being in contact with a manipulated part or not.

However, it is also contemplated that the plate is formed from a mesh-like material that may be rigid, semi-rigid, or flexible. The mesh-like material may be formed by interlaced material strands made from metal, textile, polymers, and/or the like. Further, it is contemplated that the plate may also be comprised of multiple materials. For example, the plate may be formed from a base structural material (e.g., polymer, metal) and a second part-contacting material (e.g., polymer, foam, textile, and mesh). The multiple-material concept may allow for the plate to realize advantages of the multiple materials selected.

The plate 150, in an exemplary aspect, is coupled, either permanently or temporarily, to the vacuum distributor 110. For example, it is contemplated that the plate 150 may be removable/replaceable to allow for adaptability to different materials and specifications. Continuing with this example, and as will be discussed with reference to FIGS. 5-14, various aperture sizes, shapes, and spacing may be used depending on the material to be manipulated (e.g., porous materials, non-porous materials, large materials, small materials, dense materials, light materials). If the plate 150 is removable (i.e., temporarily coupled), a fastening mechanism may be used (e.g., adhesive, hardware, clamps, channels, and the like) to ensure a tight bond between the plate 150 and the vacuum distributor 110. If the plate 150 is permanently coupled to the vacuum distributor 110, then known techniques may be used (e.g., welding, bonding, adhesives, mechanical fasteners, and the like).

When used in combination, the vacuum generator 102, the vacuum distributor 110, and the plate 150, the vacuum tool 100 is functional to generate a suction force that draws a material towards the exterior plate surface 158 (also referred to as a manufacturing-part-contacting surface) where the material is maintained against the plate 150 until the force applied to the material is less than a force repelling (e.g., gravity, vacuum) the material from the plate 150. In use, the vacuum tool is therefore able to approach a part, generate a vacuum force capable of temporarily maintaining the part in contact with the plate 150, move the vacuum tool 100 and the part to a new location, and then allow the part to release from the vacuum tool 100 at the new position (e.g., at a new location, in contact with a new material, at a new manufacturing process, and the like).

In an exemplary aspect, the plate 150 (or in particular the exterior plate surface 158) has a surface area that is larger than a material/part to be manipulated. Further, it is contemplated that one or more apertures extending through the plate 150 are covered by a part to be manipulated. Stated differently, it is contemplated that a surface area defined by one or more apertures extending through the plate 150 exceeds a surface area of a part to be manipulated. Additionally, it is contemplated that a geometry defined by two or more apertures extending through the plate 150 results in one or more apertures not contacting (completely or partially) a material/part to be manipulated. As a result, it is contemplated that inefficiency in vacuum force is experienced by the vacuum tool as a result of unusable apertures. However, in an exemplary aspect, the inclusion of unusable apertures is an intended result to allow for a higher degree of latitude in positioning the vacuum tool relative to the part. Further, the intentional inclusion of unusable (unusable for purposes of a particular part to be manipulated (e.g., active vacuum apertures that are ineffective for contacting a portion of the part)) apertures allows for vacuum force leakage while still effectively manipulating a part. In an exemplary aspect, a plurality of apertures extending through a plate 150 is further comprised of one or more leaking apertures, an aperture not intended to be used in the manipulation of a part.

In an exemplary aspect, it is contemplated that a vacuum tool, such as the vacuum tool 100, is capable of generating a suction force up to 200 grams. Further, it is contemplated that the pickup tool 100 may have 60 grams to 120 grams of vacuum (i.e., suction) force. In an exemplary aspect, the pickup tool 100 operates with about 90 grams of vacuum force. However, it is contemplated that changes in one or more configurations (e.g., vacuum generator, plate, apertures), material of part being manipulated (e.g., flexibility, porosity), and percent of apertures covered by the part may all affect a vacuum force of an exemplary pickup tool. Further, it is contemplated that when multiple distributors are used in conjunction the vacuum force is adjusted commensurately. For example, the pickup tool of FIG. 16 (to be discussed hereinafter) has ten vacuum distributors and may therefore have a vacuum force of about 600 grams to about 1.2 kilograms (10×60 to 120 grams). Similarly, a pickup tool having 6 vacuum distributors may have a suction force of about 540 grams (6×90 grams). However, it is contemplated that air pressure/volume supplied to the vacuum generators is not affected by a plurality of generators operating simultaneously. If an air pressure or value is reduced (or otherwise altered) it is contemplated that a resulting cumulative vacuum force is also altered.

Figure 3:
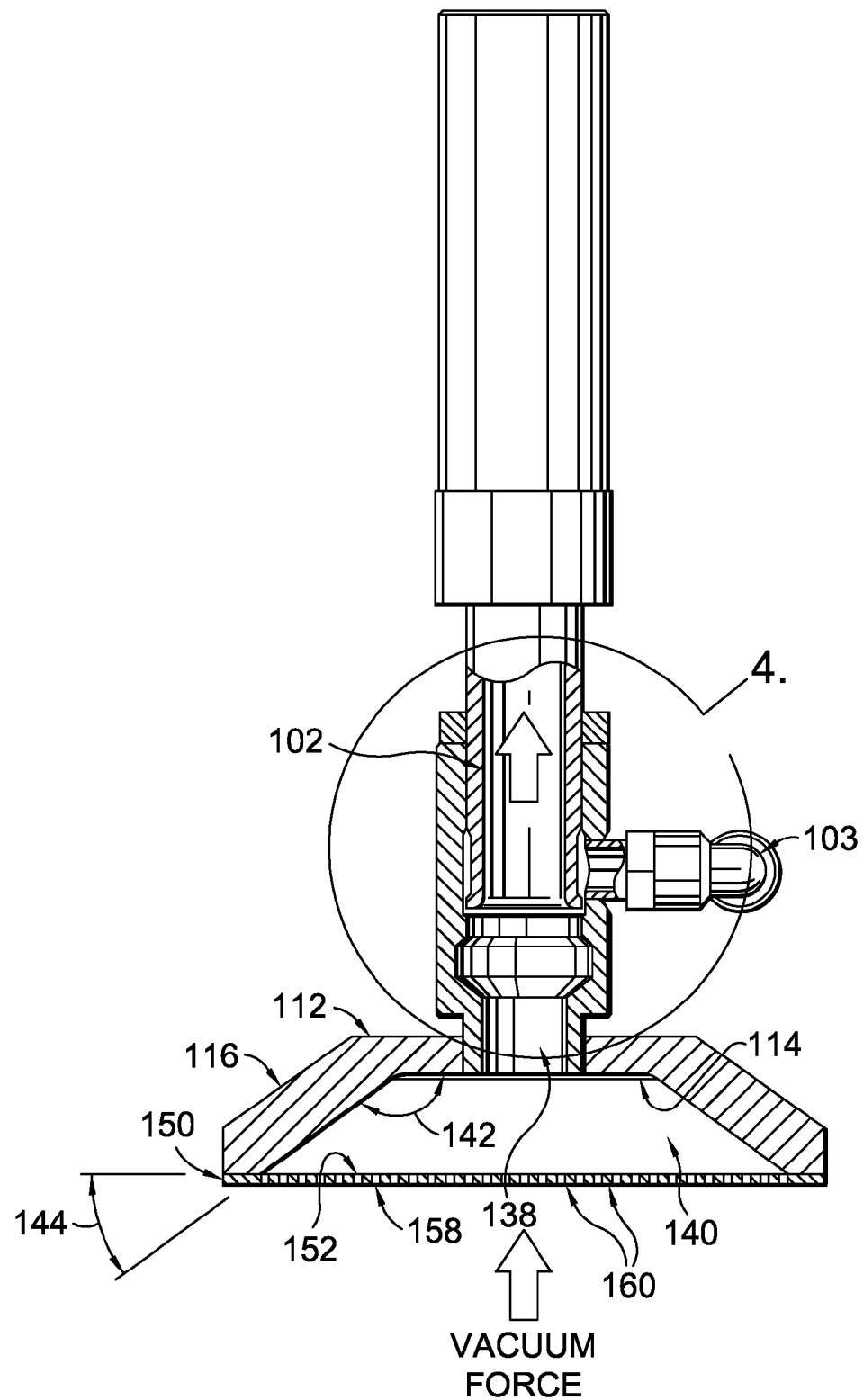
FIG. 3 depicts a front-to-back view of the vacuum tool along the cutline 3-3 of FIG. 1, in accordance with aspects of the present invention.

FIG. 3 depicts a front-to-back view of the vacuum tool 100 along the cutline 3-3 of FIG. 1, in accordance with aspects of the present invention. In particular, FIG. 3 provides a cut view of the vacuum generator 102. As will be discussed in greater detail with respect to FIG. 4, the vacuum generator 102, in the exemplary aspect, is an air amplifier utilizing a coandă effect to generate a vacuum force.

In this example, air is drawn from the exterior plate surface 158 through a plurality of apertures 160 through the plate 150 to the vacuum distribution cavity 140. The vacuum distribution cavity 140 is enclosed between the vacuum distributor 110 and the plate 150, such that if the plate 150 is a non-porous (i.e., lacked the plurality of apertures 160) surface, then an area of low pressure would be generated in the vacuum distribution cavity 140 when the vacuum generator 102 is activated. However, returning to the example including the plurality of aperture 160, the air is drawn into the vacuum distribution cavity 140 towards the vacuum aperture 138, which then allows the air to be drawn into the vacuum generator 102.

Figure 4:
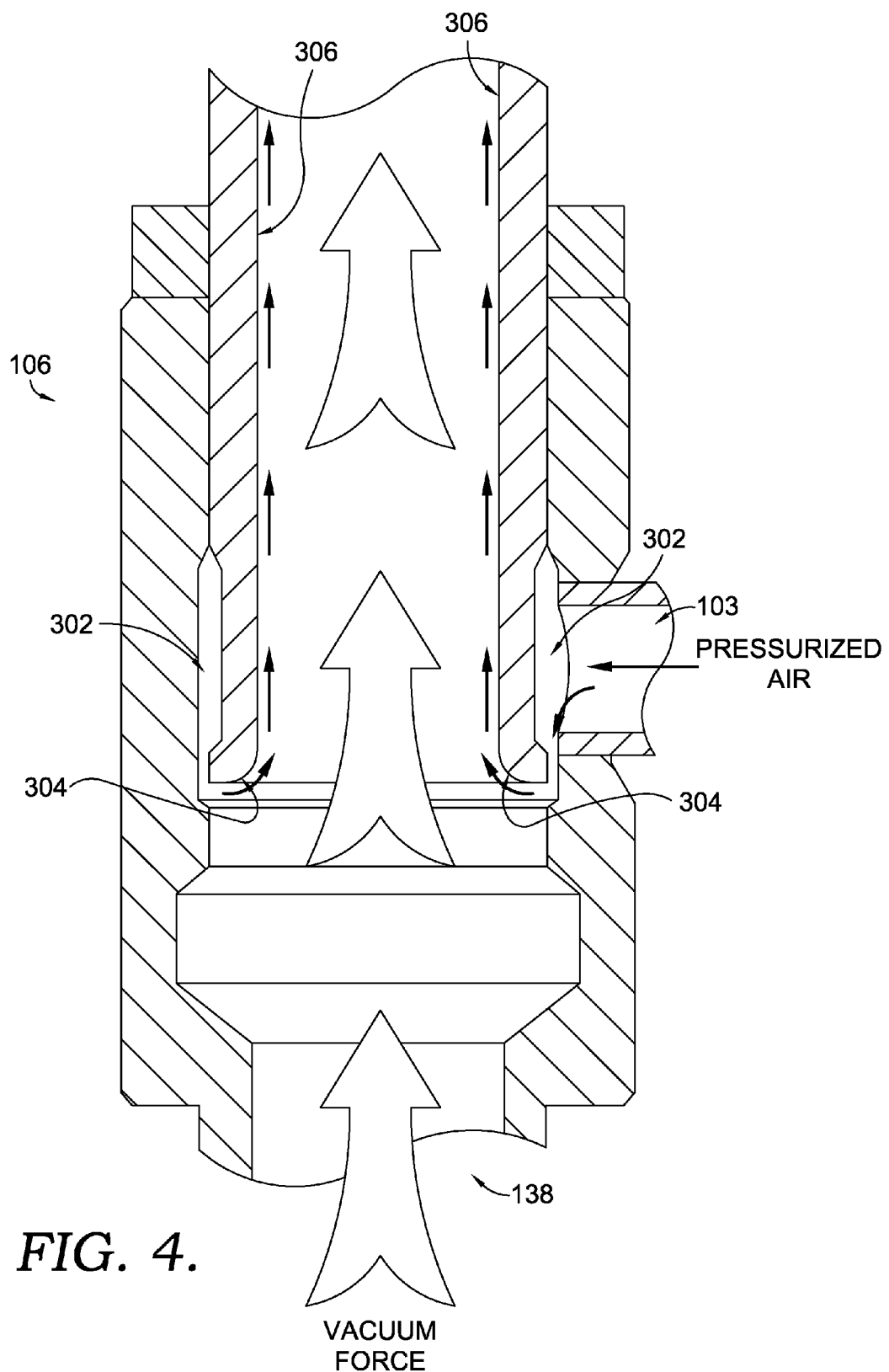
FIG. 4 depicts a focused view of the vacuum generator as cut along the cutline 3-3 from FIG. 1, in accordance with aspects of the present invention.

FIG. 3 identifies a zoomed view of the vacuum generator 102 depicted in FIG. 4. FIG. 4 depicts a focused view of the vacuum generator 102 as cut along the cutline 3-3 from FIG. 1, in accordance with aspects of the present invention. The vacuum generator depicted in FIG. 4 is a coandă effect (i.e., air amplifier) vacuum pump 106. The coandă effect vacuum pump injects pressurized air at an inlet 103. The inlet 103 directs the pressurized air through an internal chamber 302 to a sidewall flange 304. The pressurized air, utilizing the coandă effect, curves around the sidewall flange 304 and flows along an internal sidewall 306. As a result of the pressurized air movement, a vacuum force is generated in the same direction as the flow of the pressurized air along the internal sidewall 306. Consequently, a direction of suction extends up through the vacuum aperture 138.

Figure 5:
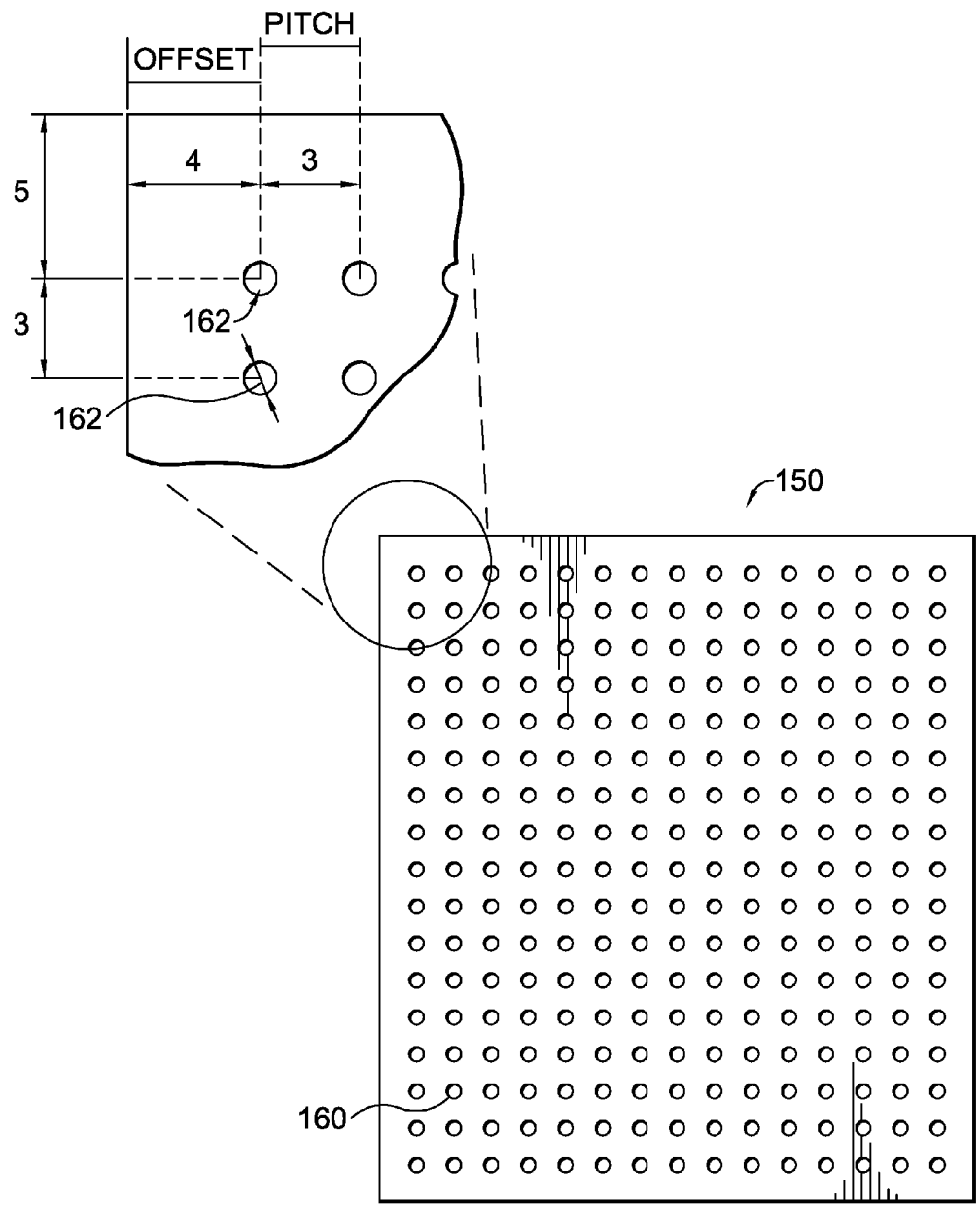
FIG. 5 depicts an exemplary plate comprised of the plurality of apertures, in accordance with aspects of the present invention.

FIG. 5 depicts an exemplary plate 150 comprised of the plurality of apertures 160, in accordance with aspects of the present invention. While the plate 150 is illustrated as having a rectangular footprint, as previously discussed, it is contemplated that any geometry may be implemented (e.g., circular, non-circular) depending, in part, on the material to be manipulated, a robot controlling the vacuum tool 100, and/or components of the vacuum tool 100. Further, it is contemplated that in exemplary aspects a first plate may be substituted for a second plate on the vacuum tool. For example, rather than switching out an entire vacuum tool as a result of a change in material, parts, etc., the plate 150 may instead be changed on a particular vacuum tool to provide alternative characteristics to the vacuum tool (e.g., a first plate may have a few large apertures and a second plate may have many small apertures).

The plurality of apertures 160 may be defined, at least in part, by a geometry (e.g., circular, hatch, bulbous, rectangular), size (e.g., diameter, radius, area, length, width), offset from elements (e.g., distance from outer edge, distance from a non-porous portion), and pitch (e.g., distance between apertures. The pitch of two apertures is defined as a distance from a first aperture to a second aperture. The pitch may be measured in a variety of manners. For example, the pitch may be measured from the closest two points of two apertures, from the surface area center of two apertures (e.g., center of circular apertures), from a particular feature of two apertures.

The size of the apertures may be defined based on an amount of surface area (or a variable to calculate surface area) exposed by each aperture. For example, a diameter measurement provides an indication of a circular aperture's size.

Depending on desired characteristics of a vacuum tool, the variables associated with the apertures may be adjusted. For example, a non-porous material of low density may not require much vacuum force to maintain the material in contact with the vacuum tool under normal operating conditions. However, a large porous mesh material may, on the other hand, require a significant amount of vacuum force to maintain the material against the vacuum tool under normal operating conditions. Therefore, to limit the amount of energy placed into the system (e.g., amount of pressurized air to operate a coandă effect vacuum pump, electricity to operate a mechanical vacuum pump) an optimization of the apertures may be implemented.

For example, a variable that may be sufficient for typical materials handled in a footwear, apparel, and the like industry may include, but not be limited to, apertures having a diameter between 0.5 and 5 millimeters (mm), between 1 mm and 4 mm, between 1 mm and 3 mm, 1.5 mm, 2 mm, 2.5 mm, 3 mm, and the like. However, larger and smaller diameter (or comparable surface area) apertures are contemplated. Similarly, the pitch may range between 1 mm and 8 mm, between 2 mm and 6 mm, between 2 mm and 5 mm, 3 mm, 3.5 mm, 4 mm, 4.5 mm, 5 mm, 5.5 mm, 6 mm, and the like. However, larger and smaller pitch measurements are contemplated.

Additionally, it is contemplated that a variable size and a variable pitch may be implemented in aspects of the present invention. For example, a compound part composed of both a porous material portion and a non-porous material portion may utilize different variables to accomplish the same level of manipulation. In this example, variables that lead to a reduction in necessary vacuum force in an area to be contacted by the non-porous material and variable that lead to higher vacuum forces in an area to be contacted by the porous material may be implemented. Further, a vision system or other identification system may be used in conjunction to further ensure a proper placement of the material with respect to the plurality of apertures occurs. Additionally, it is contemplated that a relationship between pitch and size may be utilized to locate the plurality of apertures. For example, a pitch from a larger sized aperture may be greater than a pitch from a smaller sized aperture (or vice versa).

An additional variable is the offset. In an exemplary aspect, the offset is a distance of an aperture from an outside edge of the plate 150. Different apertures may have different offsets. Further different edges may implement different offsets. For example an offset along a front edge may be different from an offset along a side edge. The offset may range from no offset to 8 mm (or more). In practice, an offset ranging from 1 mm to 5 mm may accomplish characteristics of exemplary aspects of the present invention.

The plurality of apertures 160 may be formed in the plate 150 utilizing a number of manufacturing techniques. For example apertures may be punched, drilled, etched, carved, melted, and/or cut from the plate 150. In an exemplary embodiment, the plate 150 is formed from a material that is responsive to laser cutting. For example polymer-based materials and some metal-based materials may be used in conjunction with laser cutting of the plurality of apertures. Further, it is contemplated that the geometry of the apertures may be variable as the aperture extends through the thickness of the plate. For example, the aperture may have a diameter of a first size on a top surface of the plate and a diameter of a second size at the opposite bottom surface of the plate. This variable in geometry mat result in a conical geometry extending through the plate. Additional geometries are contemplated herein (e.g., pyramid).

Figure 6:
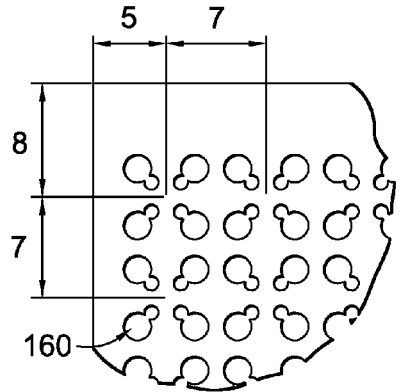
FIGS. 6-15 depict various aperture variations in a plate, in accordance with aspects of the present invention.
Figure 7:
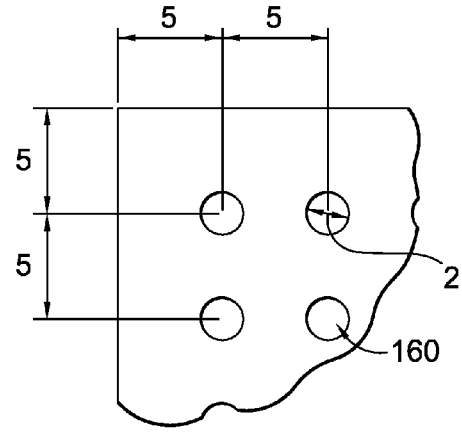
Figure 8:
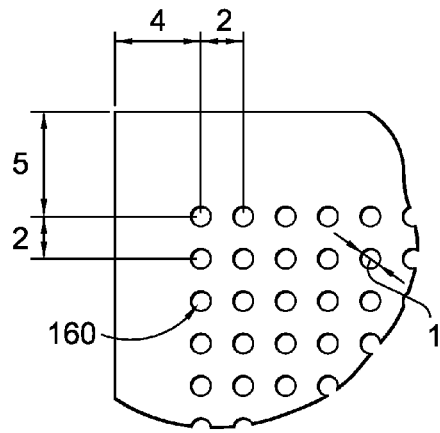
Figure 9:
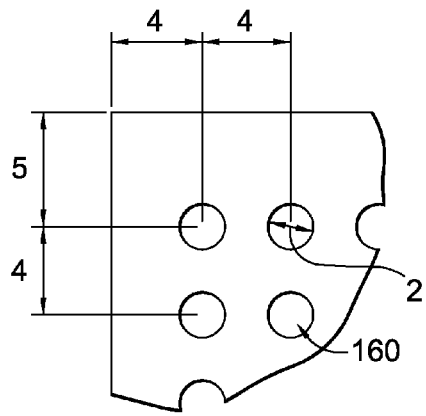
Figure 10:
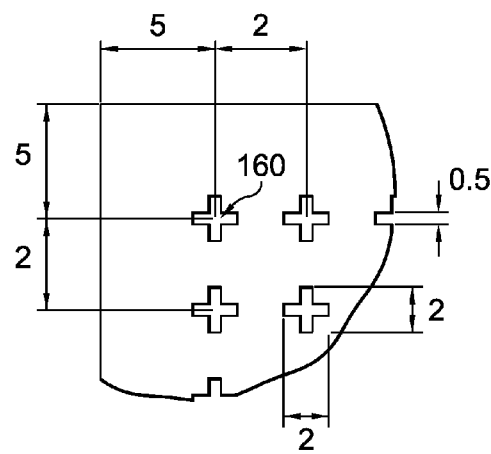
Figure 11:
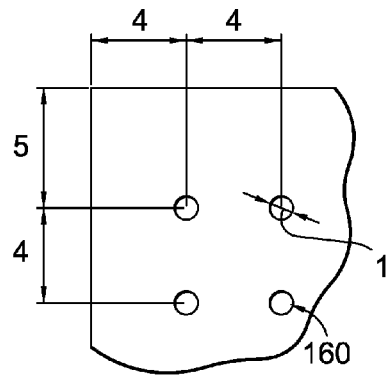
Figure 12:
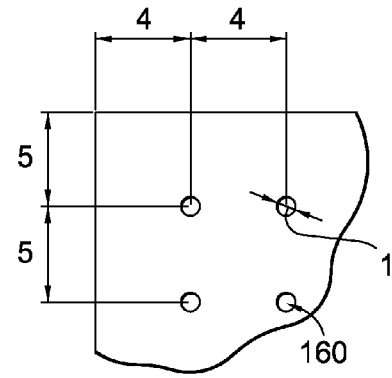
Figure 13:
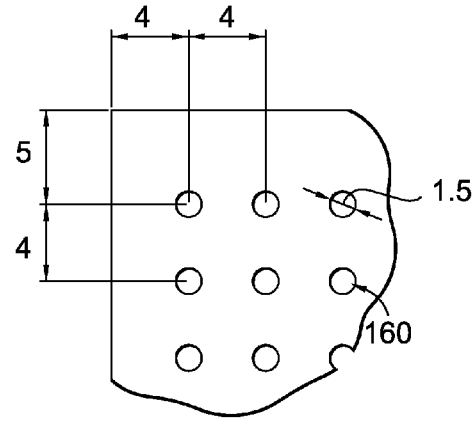
Figure 14:
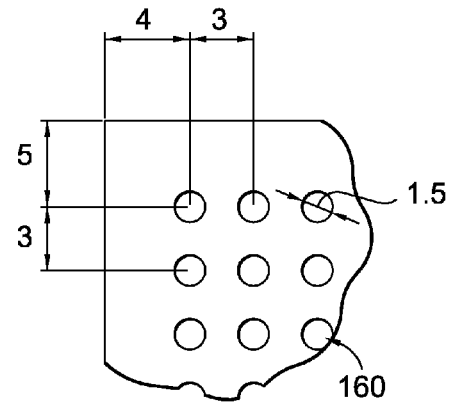
Figure 15:
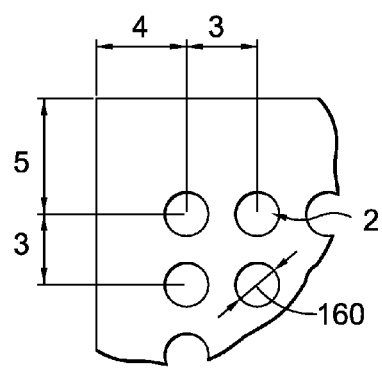

FIGS. 6-15 provide exemplary aperture variable selections similar to that discussed with respect to FIG. 5, in accordance with aspects of the present invention. The following examples are not intended to be limiting, but instead exemplary in nature. FIG. 6 depicts non-circular apertures having a first offset of 5 mm and a second offset of 8 mm and a pitch of 7 mm. FIG. 7 depicts circular apertures having an offset and pitch of 5 mm with a diameter of 2 mm. FIG. 8 depicts circular apertures having a diameter of 1 mm, a pitch of 2 mm, and offsets of 4 mm and 5 mm. FIG. 9 depicts circular apertures having a diameter of 2 mm, a pitch of 4 mm, and offsets of 5 mm and 4 mm. FIG. 10 depicts exemplary geometric apertures having a pitch of 4 mm and offsets of 5 mm. FIG. 11 depicts circular apertures having a diameter of 1 mm, a pitch of 4 mm, and offsets of 5 mm and 4 mm. FIG. 12 depicts circular apertures having a diameter of 1 mm, a pitch of 5 mm, and offsets of 5 mm. FIG. 13 depicts circular apertures having a diameter of 1.5 mm, a pitch of 4 mm, and offsets of 5 mm and 4 mm. FIG. 14 depicts circular apertures having a diameter of 1.5 mm, a pitch of 3 mm, and offsets of 4 mm. FIG. 15 depicts circular apertures having a diameter of 2 mm, a pitch of 3 mm, and offsets of 5 mm and 4 mm. As previously discussed, it is contemplated that shape, size, pitch, and offset may be altered uniformly or variably in any combination to achieve a desired result.

Depending on the footprint of the plate 150, the offset, the pitch, the geometry of the apertures, the layout of the apertures, and the size of the apertures, any number of apertures may be utilized. For example, it is contemplated that the plate 150 of FIG. 16 may have 11,000 to 11,500 apertures. In a particular aspect, it is contemplated around 11,275 apertures are utilized on the plate 150 of FIG. 16. Further, a plate may be comprised of 4,500 to 4,750 apertures. In particular, it is contemplated that 4,700 apertures may be included in an exemplary plate.

Changes to the vacuum generator 102, the plate 150, and the overall size of the vacuum tool 100 may affect the air consumption and pressure when utilizing a coandă effect vacuum pump or a venturi vacuum pump For example, it is contemplated that a given coandă effect vacuum pump may generate 50 g/cm$^2$ of vacuum force. To accomplish this level of vacuum, it is contemplated that a pneumatic pressure of 0.55 to 0.65 MPa of pressure are introduced to the vacuum tool. The volume of air consumption to generate sufficient vacuum may also vary based on the variables. For example, it is contemplated that 1,400 Nl/min of air consumption may be utilized for the vacuum tool 100 of FIG. 16. Further, it is contemplated that 840 Nl/min of air consumption may be utilized for a vacuum tool. Further, it is contemplated that 360 Nl/min of air consumption may be utilized for a vacuum tool. As previously discussed, the footprint (e.g., surface area of the plate 150) may also affect vacuum force, air consumption, and the like. For example, it is contemplated that a plate may have a footprint approximately of 625 mm by 340 mm. Similarly, it is contemplated that a plate may have a footprint approximately of 380 mm by 240 mm. Clearly, it is contemplated that the proportions of a vacuum distributor may be altered based on a desired level of vacuum force, footprint, and additional variables.

Figure 16:
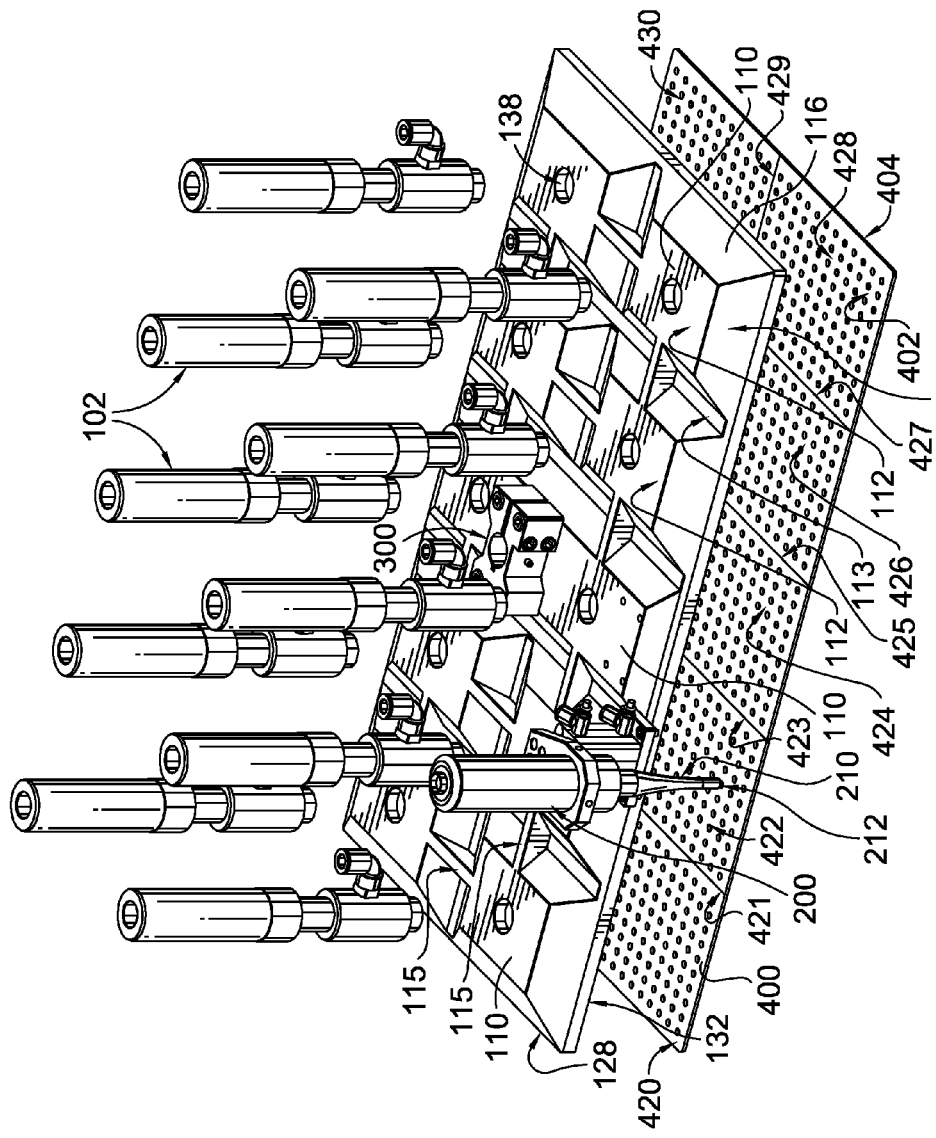
FIG. 16 depicts an exploded view of a manufacturing tool comprised of a zoned vacuum tool utilizing a multi-portion plate and an ultrasonic welder, in accordance with aspects of the present invention.

FIG. 16 depicts an exploded view of a manufacturing tool 10 comprised of a vacuum tool 100 utilizing a multi-portion plate 400 and an ultrasonic welder 200, in accordance with aspects of the present invention. Unlike the vacuum tool 100 discussed with respect to FIGS. 1 and 2, the vacuum tool 100 of FIG. 16 incorporates a plurality of vacuum generators 102, vacuum distributors 110, and vacuum distribution cavities 140 into a unified vacuum tool 100 having the multi-portion plate 400. As will be discussed hereinafter, advantages may be realized by the ability to selectively activate/deactivate vacuum force in individual portions of the vacuum tool 100. Additionally, a greater control of continuous vacuum force may be achieved by having segregated portions of the vacuum tool 100. Further, it is contemplated that a first portion of the vacuum plate 400 may have a different aperture pattern (e.g., size, pitch, offset, shape, etc) than a second portion. Further, it is contemplated that one or more portions of the multi-portion plate 400 may be removed and replaced with alternative plate portions having different characteristics (e.g., aperture pattern).

The manufacturing tool 10 also is comprised of a coupling member 300. The coupling member 300 is a feature of the manufacturing tool 10 (or the vacuum tool 100 or the ultrasonic welder 200 individually) allowing a positional member (not shown) to manipulate the position, attitude, and/or orientation of the manufacturing tool 10. For example, the coupling member 300 may allow for the addition of the manufacturing tool to a computer-numerically-controlled (CNC) robot that has a series of instruction embodied on a non-transitory computer-readable medium, that when executed by a processor and memory, cause the CNC robot to perform a series of steps. For example, the CNC robot may control the vacuum generator(s) 102, the ultrasonic welder 200, and/or the position to which the manufacturing tool 10 is located. The coupling member 300 may, therefore, allow for the temporary or permanent coupling of the manufacturing tool 10 to a positional member, such as a CNC robot.

As was previously discussed, aspects of the present invention may form portions of the manufacturing tool 10 with the intention of minimizing mass. As such, the plurality of vacuum distributors 110 of FIG. 16 include reduced material portions 113. The reduced material portions 113 eliminate portions of what could otherwise be a uniform exterior top surface. The introduction of reduced material portions 113 reduces weight of the manufacturing tool 10 to allow for a potentially smaller positional member 310 to be utilized, which may save on space and costs. Additional locations for reduced material portions 113 are contemplated about the vacuum tool 100 (e.g., side, bottom, top).

However, aspects of the present invention may desire to remain a level of rigidity of the plurality of vacuum distributors 110 as supported by a single coupling member 300. To maintain a level of rigidity while still introducing the reduced material portions 113, reinforcement portions 115 may also be introduced. For example, reinforcement portions 115 may extend from one vacuum distributor 110 to another vacuum distributor 110. Further yet, it is contemplated that in aspects of the present invention, reinforcement portions 115 may be included proximate the coupling member 300 for a similar rationale.

The plate 400 is separated from the plurality of vacuum distributors 110 in FIG. 16 for illustrative purposes. As a result, an interior plate surface 402 is viewable. In an exemplary aspect, the interior plate surface 402 is mated with a bottom portion of the plurality of vacuum distributors 110, forming an air-tight bond in this example.

The plate 400 may be comprised of a plurality of plate portions. For example, the plate 400 of FIG. 16 is comprised of eight plate portions (e.g., plate portions 420, 422, 424, 426, 428, and 430). Each plate portion may be associated with a unique distribution cavity and/or a unique distributor, in an exemplary aspect. In the alternative, multiple plate portions may be utilized in connection with a common distributor and/or distribution cavity.

The plate 400 is contemplated as being removably coupled with one or more distributors or other portions of a vacuum tool. A plate is removeably coupled when a first plate (or plate portion) may be coupled with the vacuum tool in a manner so that the plate may function for its intended purpose, but yet be removed from the vacuum tool without significantly deforming or otherwise damaging the plate and/or the vacuum tool. Examples of maintaining mechanisms (e.g., bolts, screws, magnets, adhesives, mechanical interlocking, lacing, friction fit, clips, bands, pins, suction, and the like) that may be used to maintain a plate in a position relative to the vacuum tool will be discussed with respect to FIGS. 17-20. However, additional means of removably coupling a plate and a vacuum tool are contemplated.

A junction may exist between plate portions. A junction is a meeting of a first plate portion and a second plate portion. A junction may represent a location at which a first plate portion may independently be switched from the vacuum tool while not switching a second plate portion. Therefore, as will be discussed with respect to FIG. 21 hereinafter, a variety of aperture patterns may be implemented and adjusted in a zone-like approach through the manipulation of individual plate portions.

A junction between the plates, such as a junction 421, defines a junction between the plate portion 420 and 422. It is contemplated that a tongue and groove-like coupling mechanism may be implemented along a junction to allow for the switchable coupling of the plate portions. Additional edge treatments are contemplated to provide a removable coupling between the plate portions. Other junctions depicted include 423, 425, 427, and 429. It is contemplated that a junction may extend in a linear path creating consistent-sized plate portions. Further it is contemplated that a junction may be formed in an organic or non-linear fashion to provide a level of control over a location one or more plate portions relative to a material to be manipulated.

The vacuum tool 100 is comprised of a plurality of vacuum generators 102, vacuum distributors 110, and associated vacuum distribution cavities 140. It is contemplated that any number of each may be utilized in a vacuum tool 100. For example, it is contemplated that 10, 8, 6, 4, 2, 1, or any number of units may be combined to form a cohesive vacuum tool 100. Further, any footprint may be formed. For example, while a rectangular footprint is depicted in FIG. 16, it is contemplated that a square, triangular, circular, non-circular, part-matching shape, or the like may instead be implemented. Additionally, the size of the vacuum generator 102 and/or the vacuum distributor 110 may be varied (e.g., non-uniform) in various aspects. For example, in an exemplary aspect, where a greater concentration of vacuum force is needed for a particular application, a smaller vacuum distributor may be utilized, and where a less concentrated vacuum force is needed, a larger vacuum distributor may be implemented.

Figure 17:
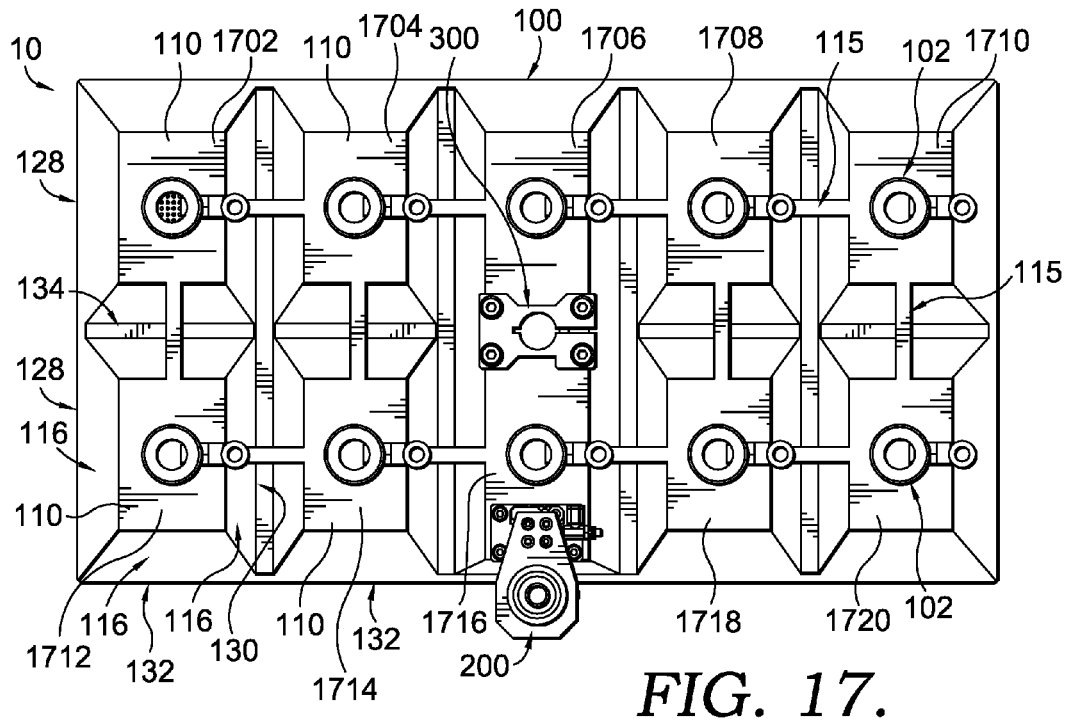
FIG. 17 depicts a top perspective of a zoned vacuum tool, in accordance with aspects of the present invention.

FIG. 17 depicts a top perspective of a zoned vacuum tool, in accordance with aspects of the present invention. The top perspective of FIG. 17 provides an exemplary view of a potential orientation of a plurality of vacuum distributors 110 to form a vacuum tool 100. As will be discussed hereinafter, various vacuum generator 102/vacuum distributor 110 combinations may be selectively activated and/or deactivated to manipulate particular parts and/or material portions. In an exemplary aspect of the present invention, one or more vacuum portions may be individually selectively activated and deactivated. It is understood that this functionality may be applied to all aspects provided herein.

In particular, it is contemplated that if a material portion/part (e.g., manufacturing part to be manipulated by the manufacturing tool 10) only requires a portion of the entire footprint of the vacuum tool 100, then unused portions of the vacuum tool 100 may be de-activated (or abstained from activating) such that vacuum force is not generated in those portions. In addition, it is contemplated that a placement jig, vision systems, known part transfer location, and the like may be utilized to further aid in determining which portions of the vacuum tool 100 may be selectively activated/deactivated. For example, if a part to be manipulated by the manufacturing tool has a surface area that only requires the activation of two vacuum tool portions, then it may be advantageous to utilize vacuum tool portions 1702 and 1704, vacuum portions 1706 and 1708, vacuum portions 1710 and 1720, vacuum portions 1718 and 1716, or vacuum portions 1714 and 1712. The determination of which vacuum portions activated/deactivated may depend on the distance the manufacturing tool is required to move from a position to locate the activated portions over the part. Additionally, the determination may depend on the location of one or more tools (e.g., ultrasonic welder 200) that will be applied to the manipulated parts (e.g., it may be advantageous to utilize two vacuum portions close to the ultrasonic welder 200 when the ultrasonic welder 200 is intended to be utilized after the manipulation).

The operation and control of one or more vacuum portions may be controlled by a controller, which is discussed hereinafter with respect to FIG. 20. For example, the control of the various vacuum portions may be accomplished utilizing a computing system having a processor and memory. For example, logic, instructions, method steps, and/or the like may be embodied on a computer-readable medium, that when executed by the processor, cause the various vacuum portions to activate/deactivate.

Each of the individual portions of the vacuum tool 100 form a separate vacuum portion such that a vacuum force generated at a first portion may not produce a vacuum force within a second portion. Similarly, it is contemplated that two or more vacuum distributors may work in tandem to form a vacuum zone that is the summation of the area covered by the two or more vacuum distributors. Therefore, it is contemplated that any combination of vacuum distributor portions may be activated independently or in concert to form a vacuum zone of any size and/or shape at any location.

Figure 18:
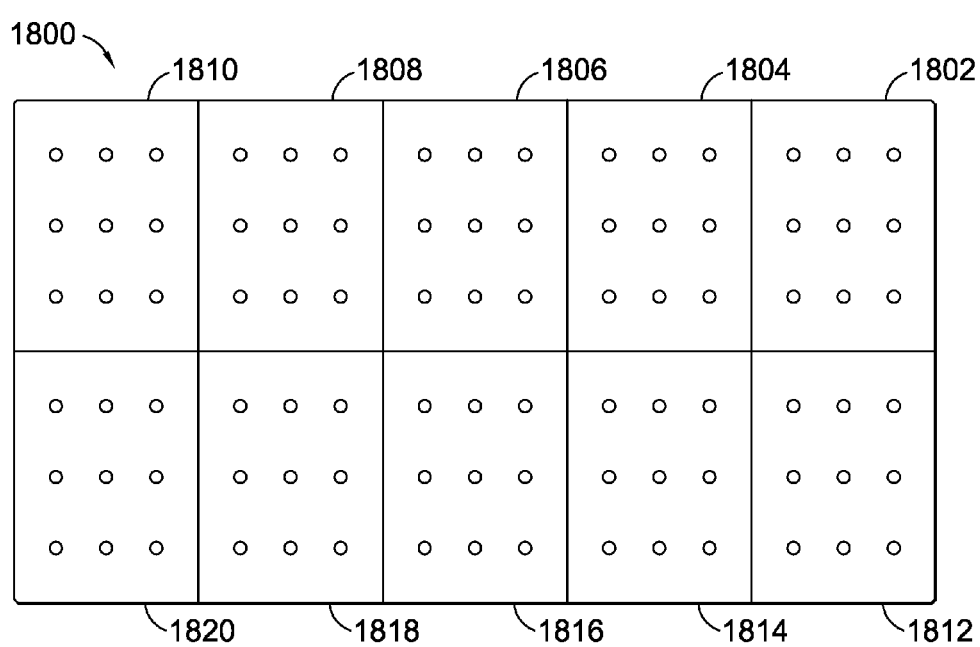
FIG. 18 depicts a bottom view of a zoned vacuum tool comprised of uniform zones, in accordance with aspects of the present invention.

FIG. 18 depicts a bottom view of a zoned vacuum tool comprised of uniform zones, in accordance with aspects of the present invention. The bottom view may be of a plate 1800 that is comprised of ten individual zones (1802, 1804, 1806, 1808, 1810, 1812, 1814, 1816, 1818, and 1820) that each may correspond to a unique vacuum distributor, such as the plurality of vacuum distributors depicted in FIG. 17. For example, the zone 1802 may correspond to the vacuum tool portion 1702 of FIG. 17 and the zone 1820 may correspond with the vacuum portion 1720 of FIG. 17. Therefore, in this example, each of the zones may correspond to a particular vacuum distributor such that activation of a particular vacuum distributor results in a vacuum force at the corresponding zone. As a result, individual zones may be activated or deactivated based on the activation or deactivation of their respective vacuum generator/vacuum distributor.

It is contemplated that any of the zones may be active in any combination and in any order. For example, the zone 1802 may be activated first to move a material portion that fits within the zone 1802. Following the manipulation of the material by the zone 1802, that zone may then be deactivated. For example, a small piece of material, such as a portion of a shoe to be manufactured may be manipulated by the zone 1802 by picking up the material and positioning the material on a larger portion of material, such as the upper of the shoe. By deactivating the zone 1802, the small portion of material may be deposited in a desired location on the upper material. Subsequently, it may be desired to move both the upper material, which is the size of multiple zones, and the smaller material at the same time and in the same orientation. In this example, the zones 1802, 1804, 1806, 1812, 1814, and 1816 may all be activated to form a vacuum force that is present at each of the zones. Consequently, if the upper and the already positioned small material fit within the activated six zones, the combination of material portions may be moved to a new location and/or new orientation while maintaining their relative position to one another.

Figure 19:
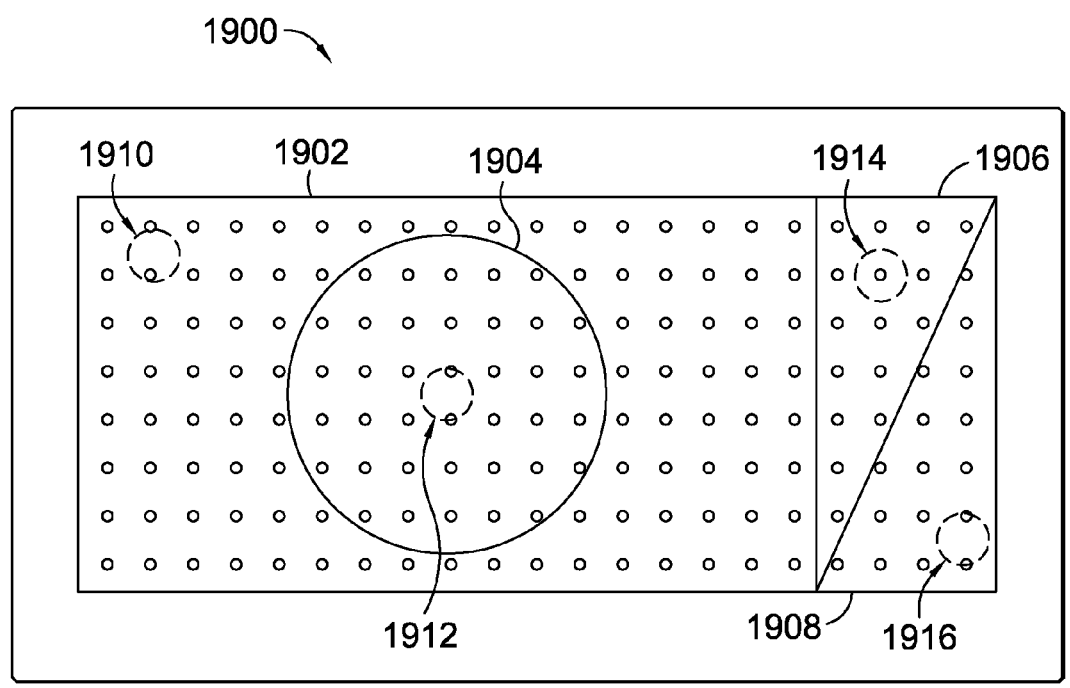
FIG. 19 depicts an alternative bottom view of zoned vacuum tool comprised of irregular zones, in accordance with aspects of the present invention.

FIG. 19 depicts an alternative bottom view of a zoned vacuum tool comprised of irregular zones, in accordance with aspects of the present invention. The bottom view may be of a material-contacting surface of an exemplary plate 1900. The plate 1900 is comprised of several zones, such as a zone 1902, a zone 1904, a zone 1914, and a zone 1916. Further, locations of individual vacuum generators are depicted with each of the zones. For example, the locations of vacuum generators may correspond to zones 1910, 1912, 1914, and 1916. However, it is contemplated that any number and any location of vacuum generators may be implemented.

In the exemplary plate 1900, the zone 1902 may represent a rectangular area less the circular zone 1904. For example, it is contemplated that the area defined by the zone 1902 (sans the zone 1904) may correspond, at least in part, with a particular material portion. Such that the material portion may have a cut circular zone that is desired to be left in an original position while the rectangular remnant is removed. In this scenario, a complete rectangular material portion may be moved into location using a combination of zones, such as the zone 1902 and the zone 1904. A cutting operation may then be performed that cuts a circular area free from the rectangular material piece. If the remnant resulting from cutting the circular portion is to be removed, the zone 1902 may be activated while the zone 1904 may be deactivated. Upon activation of the zone 1902, the rectangular remnant may be picked up and moved while the circular cutout that corresponds with the deactivated zone 1904 is maintained in the previous position.

Similarly, the zones 1906 and 1908 may be used independently to manipulate material portions or they may be used in concert to manipulate a common material portion. Therefore, it is contemplated that any combination of zones that are of varied sizes, shapes, and locations may be used in any sequence, order, and/or combination within a common manufacturing tool.

In the example of FIG. 19, one or more vacuum distributors shaped to correspond to a particular zone are contemplated. For example, it is contemplated that each of the zones has a single respective vacuum distributor that has a coverage area commensurate with that of the zone indicated on the plate 1900. For example, the zone 1912 may be associated with a circular vacuum distributor. Similarly, it is contemplated that the zone 1908 is associated with a vacuum distributor having a triangular footprint. Alternatively, it is contemplated that a number of smaller than the zone vacuum distributor may be used in concert to effectively develop a surface area similar in coverage to that of a particular zone.

Apertures are depicted in FIG. 19 as being similarly sized, shaped, and positioned; however, it is contemplated that the apertures within a zone or across multiple zones may be varied. For example, it is contemplated that a grouping of apertures proximate a perimeter region of a zone may have a different size, shape, and/or spacing than those apertures located in a central region of the zone. Further, it is contemplated that an aperture would not extend across two zones, in an exemplary aspect. By not extending an aperture across two or more zones, an isolation of vacuum forces may be maintained between the zones.

The arrangement of zones depicted in FIGS. 18 and 19 are exemplary in nature and not limiting. For example, it is contemplated that zones are sized and/or shaped to accommodate specific material portions to be manipulated. For example, the plate and/or vacuum distributors may be reconfigured to adapt to different material portions to be manipulated at different manufacturing times. Therefore, it is contemplated that a zone or a combination of zones may be of any shape, size, location, orientation, and combination.

Figure 20:
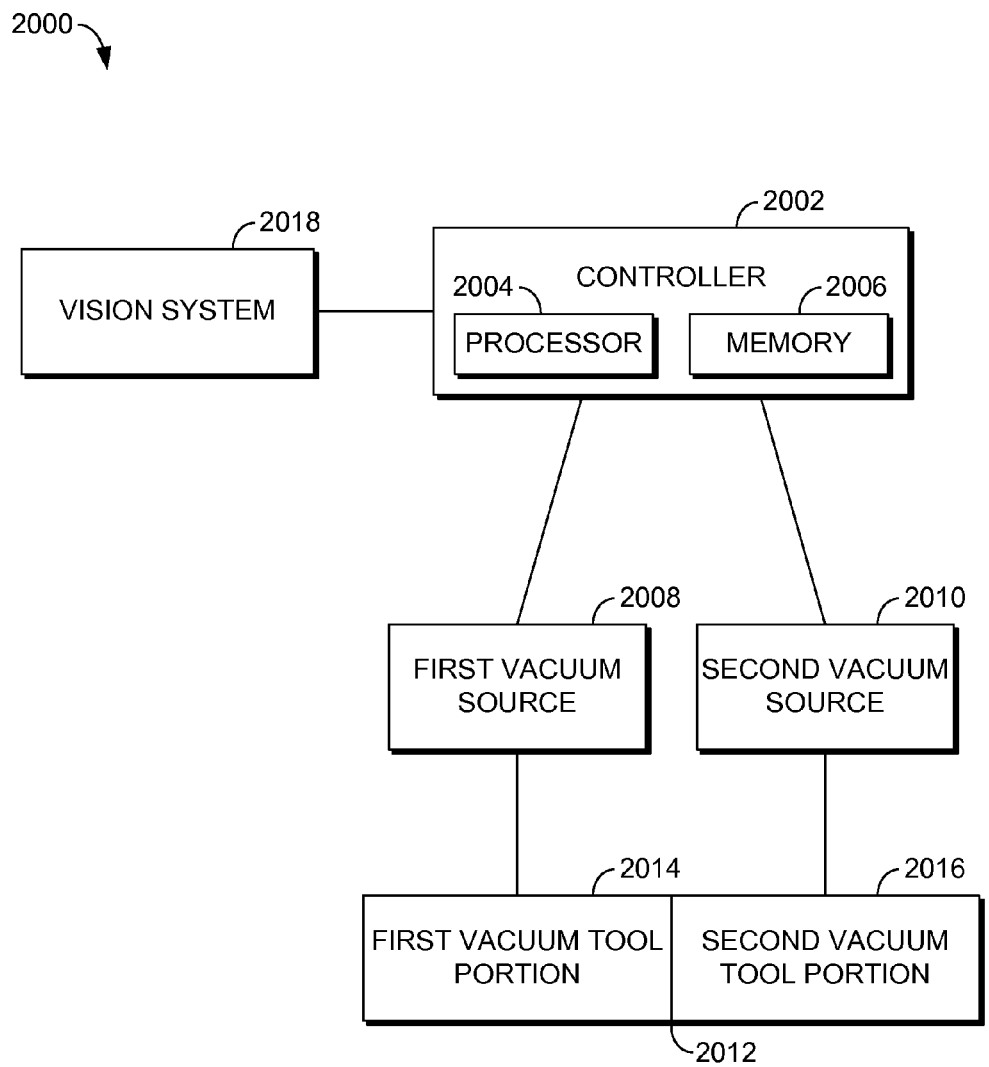
FIG. 20 depicts a system for use in implementing aspects of the present invention.

FIG. 20 depicts a system 2000 for use in implementing aspects of the present invention. The system 2000 is comprised of a controller 2002, a first vacuum source 2008, a second vacuum source 2010, a vacuum tool 2012 that is comprised of a first vacuum tool portion 2014 that is independently able to be activated from a second vacuum tool portion 2016. The system 2000 is further comprised of a vision system 2018. Together, one or more of the components may be utilized to facilitate the operation of a zoned-switched vacuum tool that has multiple zones that may be activated/deactivated independently of one another.

The controller 2002 is comprised of a processor 2004 and memory 2006. The controller 2002 may be responsible for causing the activation of the first vacuum source 2008 to effectuate a vacuum force within/at the first vacuum tool portion 2014. Additionally, the controller 2002 may be responsible for causing the activation of the second vacuum source 2010 to effectuate a vacuum force within/at the second vacuum tool portion 2016. Similarly, the controller 2002 is may also be responsible for causing the deactivation of one or more portions of the vacuum tool.

The controller 2002 may utilize input from a sensor, such as the vision system 2018, a touch sensor (not depicted), a position sensor (not depicted), or the like, when determining if and when a particular zone of the vacuum tool should be in an active or deactivated state. Further, it is contemplated that the memory 2006 may be comprised of instructions embodied on the memory that instruct the controller to cause the activation/deactivation of one or more zones in response to an input, such as an input from a sensor or from an human operator. The instructions may be interpreted, at least in part, by the processor 2004 to generate commands that may be used by valves, switches, other processors, pneumatics, and the like to alter a state of a vacuum source.

The first vacuum source 2008 and the second vacuum source 2010 may be a valve controlling a distribution of a vacuum pressure generated by a vacuum generator. Similarly, the first vacuum source 2008 and the second vacuum source 2010 may be a valve controlling a pressurized source of gas/fluid that may be used by a coanda effect, venturi effect, or the like vacuum generator to generate a vacuum force. The first vacuum source 2008 and the second vacuum source 2010 may also include electromechanically driven vacuum sources, such as electronic vacuum pumps.

It is contemplated that a vacuum source may also be any other switchable from an active to a deactivated state mechanism that can be controlled for producing or terminating the formation of a vacuum force proximate one or more vacuum tool portions. For example, a vacuum source may also be a mechanism for selectively blocking one or more apertures in the vacuum tool that define a zone. For example, a minimal porosity material having a shape of a desired zone may be space apart from the plate proximate a surface opposite the material contacting source. Such that, when in an active state, the minimal porosity material is spaced a sufficient distance from the plate surface to allow the flow of air between the minimal porosity material and the plate. When in a deactivated state, the minimal porosity material may be positioned closer to the plate surface to interfere with and/or obstruct the flow of air through the covered apertures, which may effectively diminish the vacuum force at the affected vacuum tool portion represented by the zone.

The first vacuum tool portion 2014 and the second vacuum tool portion 2016 may each represent a distinct zone that is independently switchable between a vacuum producing state and a state in which a vacuum force is not present. It is contemplated that the first vacuum tool portion 2014 and the second vacuum tool portion 2016, while independently able to be activated, are physically coupled to one another though a flexible or a rigid connection. However, it is also contemplated that a first vacuum tool portion and a second vacuum tool portion may be physically separate from one another, in an exemplary aspect.

The vision system 2018 may provide control inputs that identify a location of one or more material portions, the location of one or more portions of the vacuum tool, and the relative location between the materials and the tools. Therefore, it is contemplated that the vacuum tool may utilized inputs from the vision system to dynamically adjust positions and activated zones based on detected locations of the captured objects. A vision system may be comprised of a camera that is capable of detecting and recognizing one or more objects based on shape or other markers. In combination with a computing device having a processor and memory, the vision system may be functional for providing context and other positional indications useable by the zoned vacuum tool.

Figure 21:
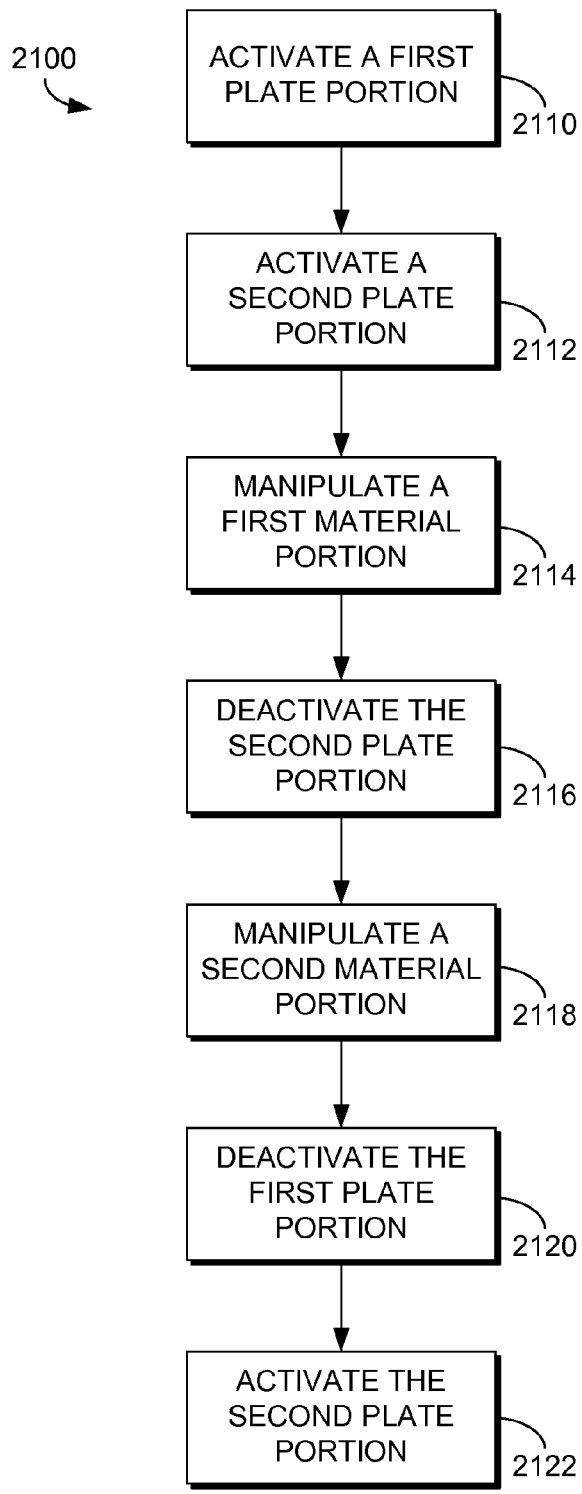
FIG. 21 depicts a block diagram illustrating an exemplary method for utilizing a zoned vacuum tool, in accordance with aspects of the present invention.

FIG. 21 depicts a block diagram illustrating an exemplary method 2100 for utilizing a zoned vacuum tool, in accordance with aspects of the present invention. At a block 2110, a first plate portion is activated. For example, it is contemplated that a controller, using a processor and instructions embodied on memory, communicates a command, such as through a network (wired or wirelessly) to a first vacuum source. Upon receiving the command, the first vacuum source produces a vacuum force that is effective proximate a bottom material-contacting surface of a vacuum tool. This bottom material-contacting surface may be the bottom surface of a plate. As previously discussed, it is contemplated that the activation of a plate portion may be achieved by introducing pressurized air to a vacuum generator, introducing lower pressure air than the ambient pressure to form a vacuum force, or selectively blocking one or more apertures of a plate.

A block 2112 represents a second plate portion is activated. The second plate portion may represent a second zone and the first plate portion may represent a first zone. Therefore, it is contemplated that a common plate may have at least two zones that are each in a common plane allowing for the manipulation of a material portion in that plane. Each of the zones may be independently activated/deactivated by a controller (and/or a user operator), such that at any given time any combination of zones may be activated or deactivate in any combination.

A block 2114 represents a manipulation of a first material portion. For example, both the first plate portion and the second plate portion may be used to move the first material portion. Alternatively, to allow for a less precise positioning of the material portion and the vacuum tool, both zones may be utilized to provide a greater margin of area in which the material portion can be successfully manipulated by the vacuum tool. As discussed herein, the manipulation of the material portion may include changing the position of the first material portion in an X, Y, and/or Z direction and/or rotation. This manipulation may be accomplished by having a vacuum force generate an attractive bond between the material portion and the material contacting surface of the plate, such that when bonded temporarily by the vacuum force, the material portions moves with the plate's movement.

A block 2116 represents the deactivation of the second plate portion. The second plate portion may be deactivated independently of the first plate portion such that the deactivation of the second plate portion does not affect the vacuum force being generated proximate the first plate portion/zone. The second plate portion may be deactivated so that a second material portion may be manipulated, as depicted at a block 2118. For example, if the first material portion is a large portion of a shoe's upper and the second material portion is a small detail piece that is to be positioned on the shoe upper, the second plate portion may be deactivated to prevent interfering with the shoe upper as the small detail piece is positioned and placed on the shoe upper by the vacuum tool.

A block 2120 represents the deactivation of the first plate portion. As can be appreciated from the foregoing, the first plate portion and the second plate portion may be activated/deactivated in any combination. Therefore, during a period in which the first plate portion and the second plate portion are not needed for the manipulation of one or more material portions, the plate portions may be deactivated. For example, it is contemplated that one or more additional tools may be coupled with the vacuum tool, as discussed hereinabove, such as a welding tool. During a welding operation active plate portions may interfere with the welding operation. However, other manufacturing operations may utilize an active plate portion to maintain a material portion in a desired position.

A block 2122 represents the activation of the second plate portion. In this example, the second plate portion may be activated during a period in which the first plate portion is deactivated. For example, to reduce a travel time of the vacuum tool as a whole, it may be advantageous to use a first zone to place a material portion and then use a second zone to subsequently move the same material portion. Therefore, a large plate may service a small part, which may reduce a travel distance/time of the vacuum tool as a whole.

Figure 22:
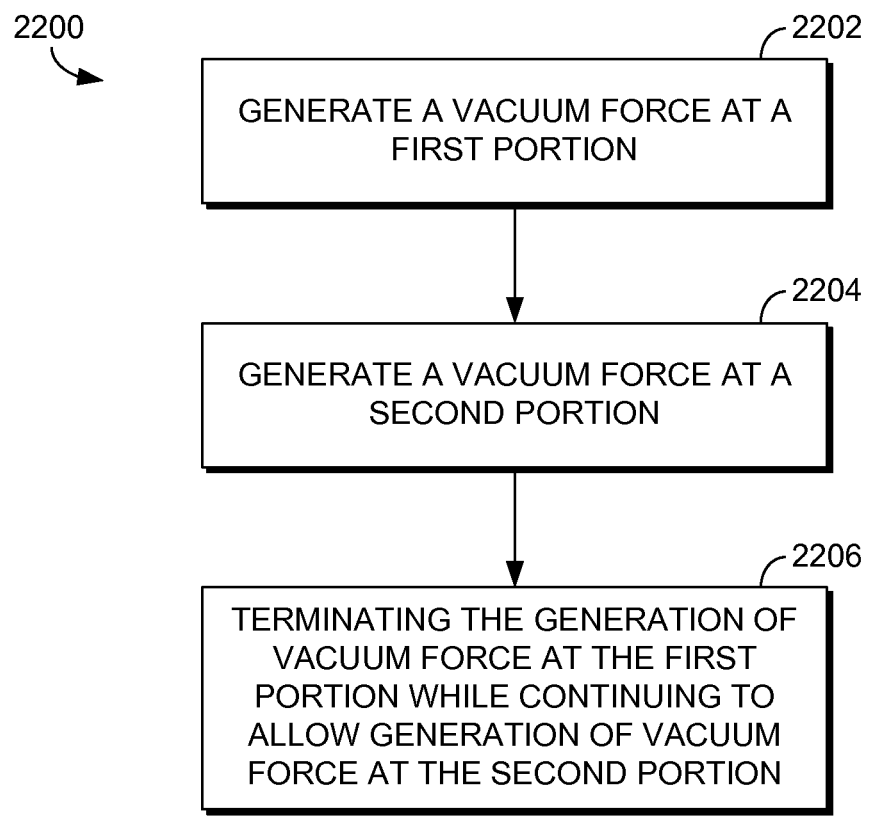
FIG. 22 depicts a block diagram illustrating another exemplary method for utilizing a zoned vacuum tool, in accordance with aspects of the present invention.

FIG. 22 depicts a block diagram illustrating another exemplary method 2200 for utilizing a zoned vacuum tool, in accordance with aspects of the present invention. A block 2202 depicts a step of generating a vacuum force at a first plate portion. As previously discussed, a plate portion may be a zone of any size, shape, and location on a bottom material-contacting surface of a vacuum tool. The generation of a vacuum force, as previously discussed, may be accomplished utilizing any of the techniques provided herein. For example, a vacuum force may be generated by a coanda effect vacuum generator, a venturi vacuum generator, a mechanical vacuum pump, an electrical vacuum pump, or the like. Segregation between a first portion and a second portion may be accomplished with vacuum distributors that separate the first portion from the second portion. For example, it is contemplated that a first vacuum distributor is associated solely with the first portion and a second, different, vacuum distributor is associated solely with the second plate portion. Therefore, a vacuum force generated in connection with the first vacuum distributor is only realized in connection with the first portion of the vacuum tool and not realized in connection with a second portion of the vacuum tool.

The generation of the vacuum force may be the result of a command issued by a controller to a switch, a valve, an actuator, a pneumatic, a hydraulic, and/or the like mechanisms that allows a vacuum force to be generated in response to one or more inputs from sensors (e.g., vision systems, positional systems, contact systems) or human operators. For example, the generation of a vacuum force may result from a controller commanding an electrically controlled valve to supply pressurized air to a coanda effect vacuum generator. In response to receiving the command, the valve may open and allow the pressurized air to enter the coanda effect vacuum generator, which converts the pressurized air into a vacuum force.

A block 2204 depicts a step of generating a vacuum force at a second portion of the vacuum tool. As previously discussed, the generation of a vacuum force may be accomplished using any of the mechanisms provided herein, such as a coanda effect vacuum generator.

A block 2206 depicts a step of terminating the generation of vacuum force at the first portion while continuing to allow generation of a vacuum force at the second portion. The first portion of a vacuum tool and the second portion of the same vacuum tool may therefore be independently operated such that a common, coplanar, material contacting surface of the vacuum tool may provide an attractive force in one zone while not providing a vacuum-induced attractive force in a second zone.

Exemplary aspects are provided herein for illustrative purposes. Additional extensions/aspects are also contemplated in connection with aspects of the present invention. For example, a number, size, orientation, and/or form of components, portions, and/or attributes are contemplated within the scope of aspects of the present invention.

The invention claimed is:

1. A vacuum tool comprising:
a first vacuum distributor portion;
a first vacuum source locally coupled to the first vacuum distributor portion;
a second vacuum distributor portion, wherein the first vacuum distributor portion is coupled with the second vacuum distributor portion;
a second vacuum source locally coupled to the second vacuum distributor portion;
a multi-portion planar plate coupled to the first and second vacuum distributor portions and comprising a plurality of discrete coplanar portions, wherein the multi-portion planar plate is in fluid communication with the first and second vacuum sources on an internal side and is adapted to manipulate materials on an external side; and
the first vacuum source produces a vacuum in association with the first vacuum distributor portion that is independent of the second vacuum source that produces a vacuum in association with the second vacuum distributor portion,
wherein the vacuum associated with the first vacuum source and the vacuum associated with the second vacuum source are applied in a coplanar manner along the multi-portion planar plate.

2. The vacuum tool of claim 1 further comprising a controller, the controller functional to control the first vacuum source and the second vacuum source.

3. The vacuum tool of claim 1, wherein the first vacuum source is a valve controlling airflow that generates the vacuum.

4. The vacuum tool of claim 3, wherein the airflow is pressurized air.

5. The vacuum tool of claim 3, wherein the first vacuum source is a venturi vacuum generator or a coandǎeffect vacuum generator.

6. The vacuum tool of claim 1, wherein the first vacuum distributor and the second vacuum distributor are rigidly coupled.

7. The vacuum tool of claim 1, wherein the first vacuum distributor portion is comprised of a first bottom surface and the second vacuum distributor portion is comprised of a second bottom surface, the first bottom surface and the second bottom surface surfaces are coplanar.

8. The vacuum tool of claim 1, wherein the first vacuum distributor forms a first vacuum tool portion functional to manipulate a first material portion and the second vacuum distributor forms a second vacuum tool portion functional to manipulate a second material portion.

9. The vacuum tool of claim 8, wherein the first material portion and the second material portion form a common material piece.

10. The vacuum tool of claim 8, wherein the first material portion is a different material from the second material portion.

11. The vacuum tool of claim 1, further comprising a vision system.

12. The vacuum tool of claim 11, wherein the vision system controls, at least in part, the first vacuum source and the second vacuum source.

13. A method of operating a vacuum tool, the method comprising:
activating a first plate portion of the vacuum tool having a locally coupled first vacuum source, wherein activating a plate portion results in a vacuum force proximate the plate portion;
activating a second plate portion, wherein the first plate portion and the second plate portion form a material manipulating, common planar surface; and
deactivating the first plate portion, wherein deactivating a plate portion results in a smaller vacuum force than when activated.

14. The method of claim 13, wherein the first vacuum plate portion is coupled with the second vacuum plate portion.

15. The method of claim 13 further comprising moving the vacuum tool from a first position to a second position.

16. The method of claim 13 further comprising, manipulating a material portion.

17. The method of claim 16, wherein the material portion is manipulated by the first plate portion and the second plate portion while simultaneously activated.

18. The method of claim 16, wherein the material portion is manipulated by the first plate portion prior to activating the second plate portion.

19. The method of claim 13 further comprising receiving an input from a vision system, the input representing a position of a material portion to be manipulated by the vacuum tool.

20. A method of operating a vacuum tool, the method comprising:
   generating a vacuum force at a first plate portion of a vacuum tool with a locally coupled first vacuum source;
   generating a vacuum force at a second plate portion of a vacuum tool with a locally coupled second vacuum source; and
   terminating the generation of the vacuum force at the first plate portion while continuing to allow for generation of the vacuum force at the second plate portion, wherein the first plate portion and the second plate portion form a material manipulating, common planar surface.

21. The method of claim 20, wherein the generating of the vacuum force is terminated at the first portion prior to generating the vacuum force at the second portion.

22. The method of claim 20, wherein the generating of the vacuum force at the first portion is terminated subsequently to generating the vacuum force at the second portion.

* * * * *